(12) United States Patent
Oberle et al.

(10) Patent No.: US 11,007,587 B2
(45) Date of Patent: May 18, 2021

(54) SAWING MACHINE AND METHOD FOR CONTROLLING A SAWING MACHINE

(71) Applicant: KEURO Besitz GmbH & Co. EDV-Dienstleistungs KG, Achern (DE)

(72) Inventors: Markus Oberle, Kappelrodeck (DE); Andre Sabel, Drusenheim (FR)

(73) Assignee: KEURO Besitz GmbH & Co. EDV-Dienstleistimgs KG, Achern (DE)

( * ) Notice: Subject to any disclaimer, the term of this patent is extended or adjusted under 35 U.S.C. 154(b) by 557 days.

(21) Appl. No.: 14/298,046

(22) Filed: Jun. 6, 2014

(65) Prior Publication Data
US 2014/0360322 A1  Dec. 11, 2014

(30) Foreign Application Priority Data

Jun. 6, 2013 (DE) .......................... 102013210573.8

(51) Int. Cl.
| | | |
|---|---|---|
| *B23D 59/00* | (2006.01) | |
| *B23D 55/08* | (2006.01) | |
| *B23D 53/04* | (2006.01) | |

(52) U.S. Cl.
CPC .......... *B23D 59/001* (2013.01); *B23D 53/04* (2013.01); *B23D 55/088* (2013.01); *Y10T 83/04* (2015.04);
(Continued)

(58) Field of Classification Search
CPC .................. B23D 55/06; B23D 55/088; B23D 59/001–008; Y10T 83/141;
(Continued)

(56) References Cited

U.S. PATENT DOCUMENTS

| | | | |
|---|---|---|---|
| 4,524,812 A | 6/1985 | Murphy | |
| 7,526,985 B2 * | 5/2009 | Tokiwa | ................ B23D 55/005 83/13 |

(Continued)

FOREIGN PATENT DOCUMENTS

| | | |
|---|---|---|
| CN | 86200216 | 11/1986 |
| CN | 2170834 | 7/1994 |

(Continued)

OTHER PUBLICATIONS

CN102151899A English Translation; Weiyan Wang; dated Aug. 17, 2011; B23D53/00.*

*Primary Examiner* — Laura M Lee
(74) *Attorney, Agent, or Firm* — Volpe Koenig

(57) ABSTRACT

A method for controlling a sawing machine with a sawing tool, which is driven by an electrical sawing tool drive with a first frequency converter, and with a sawing feed device for moving the driven sawing tool at a feed rate in relation to a workpiece to be sawn, and also to such a sawing machine. The feed rate is changed over from an idling feed rate to a working feed rate when the sawing tool engages in the workpiece. A value of a physical variable which corresponds to the torque transferred from the sawing tool drive to the sawing tool or from which a change in this torque can be calculated is determined here at the first frequency converter. The changeover from the idling feed rate to the working feed rate takes place in dependence on the value of this physical variable.

13 Claims, 3 Drawing Sheets

(52) U.S. Cl.
CPC .......... *Y10T 83/141* (2015.04); *Y10T 83/4463* (2015.04); *Y10T 83/7076* (2015.04)

(58) Field of Classification Search
CPC . Y10T 83/7076; Y10T 83/148; Y10T 83/159; Y10T 83/178; Y10T 83/175
USPC .............. 83/72, 74, 788, 789, 76, 76.7, 76.8
See application file for complete search history.

(56) References Cited

U.S. PATENT DOCUMENTS

| | | | |
|---|---|---|---|
| 2002/0007711 A1* | 1/2002 | Smith | B23D 59/001 83/76 |
| 2002/0035893 A1* | 3/2002 | Schurb | B23D 63/001 76/40 |
| 2003/0097917 A1 | 5/2003 | Virvalo et al. | |
| 2004/0200329 A1* | 10/2004 | Sako | B27G 19/02 83/58 |
| 2006/0032356 A1 | 2/2006 | Newman, Jr. et al. | |
| 2006/0144202 A1 | 7/2006 | Tokiwa et al. | |
| 2010/0059144 A1* | 3/2010 | Tetelbaum | B23D 59/001 144/356 |
| 2011/0061769 A1* | 3/2011 | Gass | B27G 19/06 144/382 |

FOREIGN PATENT DOCUMENTS

| | | |
|---|---|---|
| CN | 201848600 | 6/2011 |
| CN | 102151899 | 8/2011 |
| CN | 102672271 | 9/2012 |
| DE | 2457537 | 6/1975 |
| DE | 2808245 | 8/1978 |
| DE | 3311390 | 11/1983 |
| DE | 10043012 | 5/2001 |
| DE | 102007029029 | 12/2008 |
| EP | 0313429 | 10/1988 |
| EP | 1398119 | 3/2004 |
| EP | 2476531 | 7/2012 |
| JP | 2000158231 | 6/2000 |

* cited by examiner

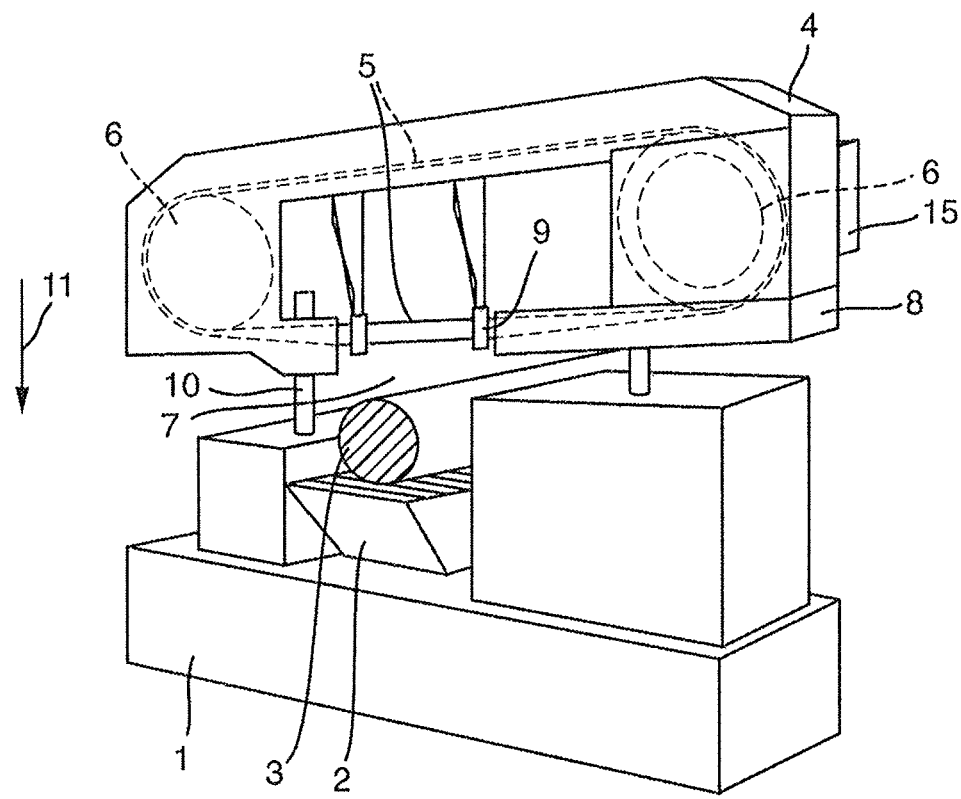
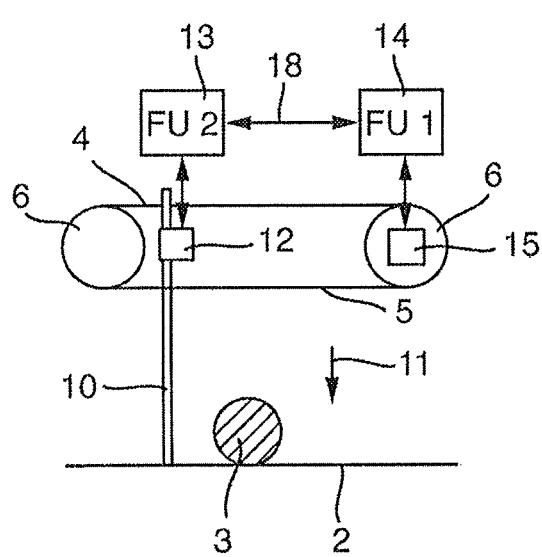 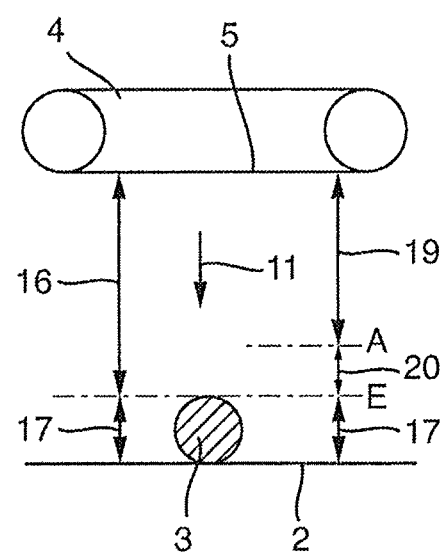
Fig. 1
Fig. 2
Fig. 3

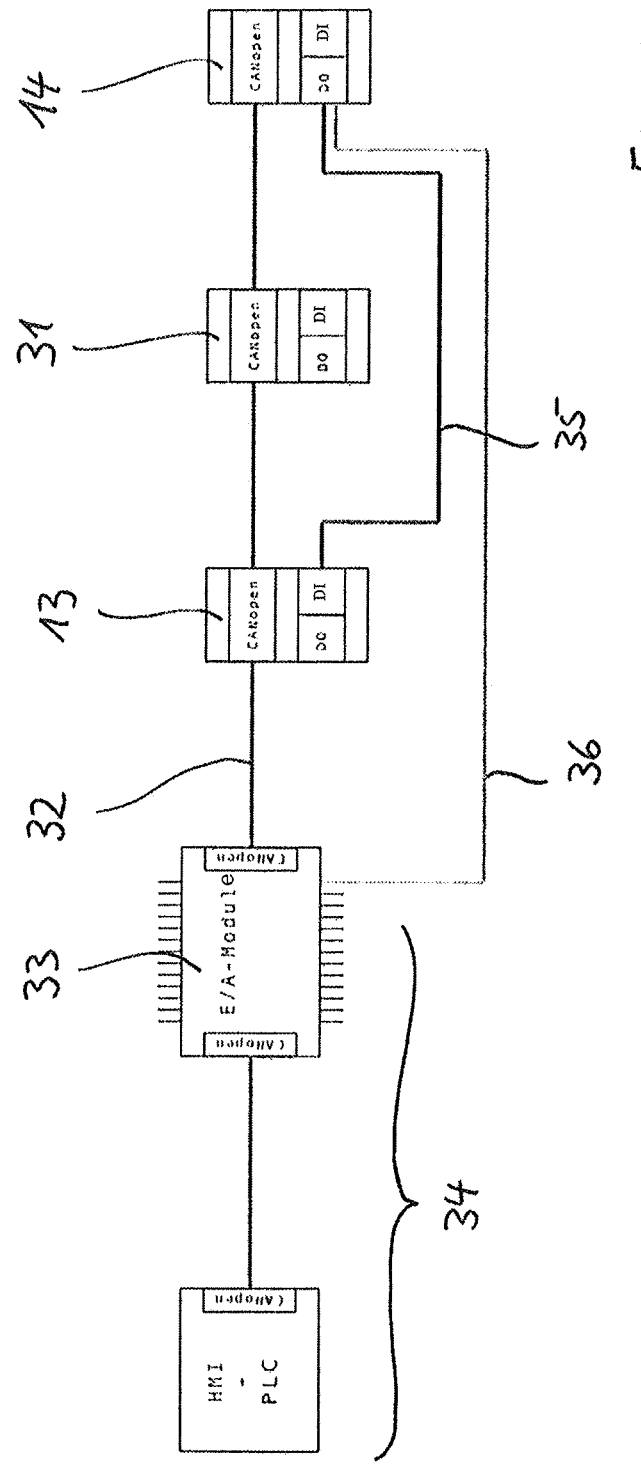

SAWING MACHINE AND METHOD FOR CONTROLLING A SAWING MACHINE

INCORPORATION BY REFERENCE

The following documents are incorporated herein by reference as if fully set forth: German Patent Application No. DE 10 2013 210 573.8, filed Jun. 6, 2013.

BACKGROUND

The present invention relates to a method for controlling a sawing machine and to a sawing machine. Such a sawing machine includes a sawing tool, which is driven by an electrical sawing tool drive with a first frequency converter. There is also a sawing feed device, which moves the driven sawing tool at a feed rate in relation to a workpiece to be sawn. This sawing feed device is formed in such a way that the feed rate at which the driven sawing tool is driven is changed over from an idling feed rate to a working feed rate when the sawing tool engages in the workpiece.

Sawing machines of the present type are usually formed as band sawing machines or as circular sawing machines. However, other types of sawing machines are also covered by the invention, in particular hack sawing machines.

The main application area of the present invention concerns sawing machines of the type mentioned at the beginning that are intended for cutting or sawing workpieces made of metal.

Depending on the type of sawing machine, the driven sawing tool, which may in particular be a saw band or a circular saw blade, is moved linearly or about a rotation axis in relation to the workpiece, the workpieces being comparatively heavy and placed by means of conveying devices onto a sawing table and clamped there.

Since sawing machines of the type in question usually saw workpieces with different cross sections, it is necessary for the clamping of a new workpiece to move the sawing tool into an initial position, in which the maximum possible workpiece cross section is exposed. In particular whenever workpieces that do not have the maximum possible cross section are to be sawn, the sawing tool must accordingly cover a relatively great distance of the feeding movement at the beginning of a sawing operation before the sawing tool penetrates into the workpiece and the actual sawing operation begins. Also, whenever a sawing operation is discontinued and the sawing tool has to be removed from the material of the workpiece, when the sawing operation is resumed the sawing tool must cover a relatively long feeding distance before it engages with the workpiece again and the actual sawing operation can be resumed.

The actual cutting operation, that is to say the feeding movement of the sawing tool during the chip-removing engagement of the sawing tool in the workpiece, takes place at a working feed rate, which of course depends on the properties of the material and in the case of workpieces made of metal is usually only of the order of a few mm/sec. In order to minimize as much as possible the non-productive times of a sawing operation that come before and after the actual cutting operation, it is necessary to increase the feed rate of the sawing tool outside the actual cutting operation, in particular when the sawing tool is approaching the workpiece. This is so because, if the aforementioned relatively great distance of the feeding movement that the sawing tool generally has to cover before the beginning of the actual sawing operation is only traversed at the working feed rate, high non-productive times occur, limiting the productivity of the sawing machine and causing corresponding costs.

In the case of a method and a sawing machine of the type in question, the feed rate of the sawing tool is therefore changed over from a higher idling feed rate to the working feed rate when the sawing tool engages in the workpiece. As long as the sawing tool is still not in engagement with the workpiece, it is therefore moved more quickly in relation to the workpiece, in particular lowered onto the workpiece, so that the non-productive times of the sawing operation are correspondingly reduced. The reference to when the sawing tool "engages" in the workpiece should be understood here as meaning that the changeover from the idling feed rate to the working feed rate takes place shortly before the beginning of the engagement, at the moment of the first engagement or shortly after the beginning of the engagement of the sawing tool in the workpiece.

It is problematic here that the driven sawing tool is damaged if it hits the workpiece and penetrates into it at too high a feed rate. The idling feed rate must therefore be chosen to be relatively low, or it must be ensured that the feed rate is changed over from the idling feed rate to the working feed rate in time to rule out damage to the sawing tool.

There are several approaches to this in the prior art. For example, in DE 24 57 537 A1 or DE 100 43 012 A1, a cutting resistance at the saw band of a band sawing machine is continuously measured and the feed rate is controlled on the basis of the measurement results in order to avoid overloading of the saw band. A corresponding band sawing machine is also disclosed in DE 33 11 390 A1. In DE 28 08 245 A1, the feed rate is controlled in dependence on the running speed of the saw band of a band sawing machine. As soon as the saw band running speed is reduced, the feed rate is slowed, in order to avoid overloading of the saw band. In EP 0 313 429 B1, a hydraulically operated band sawing machine is monitored with regard to a rise in the cutting resistance and, if there is a rise in the resistance, the feed rate is reduced, so that the feed rate is changed over from an idling feed rate to a working feed rate approximately when the sawing tool engages in the workpiece.

These known approaches to a solution have in common that the changeover of the feed rate takes place relatively slowly, so that overloading of the sawing tool when it first engages in the workpiece cannot be reliably avoided.

Other measures in the prior art work with geometrical data of the workpiece to be sawn that are pre-input or determined by sensors, so that the feed rate of the sawing tool can be slowed just before engagement in the workpiece. Therefore, in these cases the changeover from an idling feed rate to the working feed rate takes place before the first contact between the sawing tool and the workpiece to be sawn. This rules out damage to the sawing tool being caused by too high a feed rate, but requires additional expenditure on sensors and control equipment or careful, well-trained operating personnel, which in turn entails corresponding additional costs.

SUMMARY

The present invention is therefore based on the object of providing a method for controlling a sawing machine and a sawing machine of the type mentioned at the beginning in the case of which the changeover of the feed rate of the sawing tool from an idling feed rate to a working feed rate takes place reliably and in time to avoid damage to the sawing tool when it engages in the workpiece without requiring additional expenditure on control equipment and without having to require specially trained, reliable operating personnel.

This object is achieved by a method and by a sawing machine with one or more features of the invention. Preferred developments of the method according to the invention and advantageous refinements of the sawing machine according to the invention are set out below and in the claims.

The sawing machine according to the invention, which, as known per se, comprises a sawing tool that is driven by an electrical sawing tool drive with a first frequency converter and has a sawing feed device for moving the driven sawing tool at a feed rate in relation to a workpiece to be sawn, and also the method according to the invention are therefore distinguished by the fact that a value of a physical variable which corresponds to the torque transferred from the sawing tool drive to the sawing tool or from which a change in this torque can be calculated is determined at the first frequency converter, and the fact that, when the sawing tool engages in the workpiece, a changeover of the feed rate from an idling feed rate to the working feed rate takes place in dependence on the value of this physical variable.

According to the present invention, a changeover from an advantageously high idling feed rate to the working feed rate can therefore take place without additional expenditure on control equipment. This is so because sawing machines of the type in question are generally provided with an electrical sawing tool drive in which a frequency converter assumes the control of an electric motor that drives the sawing tool, that is to say a saw blade or a saw band. Physical variables which correspond to the torque transferred from the sawing tool drive to the sawing tool or from which a change in this torque can be calculated may be determined in the frequency converter from the reactions of the motor operated by the frequency converter. For example, the active current that is emitted by the frequency converter to the motor of the electrical sawing tool drive is a physical variable that allows deductions to be made in real time concerning the torque delivered by the motor to the sawing tool.

The torque transferred from the sawing tool drive to the sawing tool for its part depends directly on whether the sawing tool is merely cutting air, that is to say is still in the idling phase, or whether the sawing tool is in engagement with the workpiece to be sawn. From the very first moment that the workpiece is grazed, that is to say when the tips of the teeth of the sawing tool touch the workpiece during a feeding movement, the torque delivered by the sawing tool drive increases in response to the resistance produced by the contact between the sawing tool teeth and the workpiece. This can be detected in real time in the frequency converter of the sawing tool drive, for example from the active current delivered, so that a changeover from an idling feed rate to a working feed rate can take place while the workpiece is still only being grazed, and there is not yet any need to fear damage to or inadmissibly high loading of the sawing tool as a result of the increased resistance.

The present invention accordingly makes use of the devices of a customary sawing machine that are already present in any case in order to detect in a hitherto unachieved fast reaction time when a changeover from an advantageously high idling feed rate to the working feed rate is necessary in order to be able with certainty to avoid damage to the sawing tool. A changeover is even possible in such a short time that there has not even been a brief significantly increased loading of the sawing tool, and consequently its lifetime is advantageously prolonged.

The present invention therefore not only offers the advantage that no additional control equipment, such as in particular sensors, light barriers and the like, has to be fitted, but also offers the additional advantage of a particularly fast reaction to changes taking place at the sawing tool, in particular initial engagement of the sawing tool in a workpiece, that bring about a change in the torque of the sawing tool drive.

According to the invention, it is sufficient here if the value of a physical variable that allows deductions to be made concerning a change in the torque exerted by the sawing tool drive is determined in the frequency converter. This is so because, when this torque increases, this means in the case of a feeding movement for the sawing tool approaching the workpiece nothing other than that the sawing tool has arrived at the workpiece and is beginning to cut it. This is the point in time at which a changeover should be made from the idling feed rate to the working feed rate.

In the case of the present invention, in a first aspect this is therefore a sensorless material detection in a sawing operation in which the moment of the first grazing of the material is sensed in order to reduce the feed rate to a working feed rate. This allows the non-productive times of a sawing operation to be reduced without additional sensors, since the idling distance of the sawing tool can be covered at a significantly increased idling feed rate. It is also possible for the first time with the present invention to resume in a time-optimized manner interrupted sawing cuts in which the sawing tool is no longer directly in the cut.

The value of the physical variable determined at the first frequency converter that is used for changing over the feed rate is preferably subjected to a filtering process for smoothing its variation over time or possibly for filtering out noise signals. A significant change in the determined value of the physical variable can be detected more easily and clearly after a smoothing of the measured values.

The changeover from the idling feed rate to the working feed rate preferably takes place in dependence on a difference between an actual value of the physical variable, determined continuously or at intervals at the first frequency converter, and an average idling value. The average idling value may be a value that is typical of a specific sawing machine or be determined at the beginning of the sawing operation when the sawing tool is in any event in idling mode. As an alternative or addition to the evaluation of such a difference, the changeover from the idling feed rate to the working feed rate may also be initiated by a significant rise in the actual value of the physical variable. In the latter case, there is no need for the determination of an average idling value.

The changeover from the idling feed rate to the working feed rate is expediently only initiated when a threshold value for the difference between the possibly smoothed or filtered actual value of the physical variable and the average idling value and/or a threshold value for a rise in the actual value of the physical variable is exceeded. It may be possible for this threshold value to be set, in particular material-dependently, so that the sensitivity of the changeover according to the invention can be adjusted.

Particular advantages arise in the case of the present invention if the sawing machine according to the invention or the sawing machine used according to the invention comprises in addition to the first frequency converter of the sawing tool drive a second frequency converter as part of the sawing feed device, the second frequency converter operating a feed motor, which brings about the relative movement between the driven sawing tool and the workpiece to be sawn. This allows the method according to the invention to be implemented particularly easily and advantageously, in that the second frequency converter changes over the feed motor from the idling feed rate to the working feed rate in response to a signal that it receives from the first frequency converter. The signal transmission from the first frequency converter to the second frequency converter may for example take place in a delay-free manner by way of a digital output of the first frequency converter or by way of the fieldbus interface thereof. The implementation of the present invention is consequently possible by corresponding programming of the first and second frequency converters, without additional controls or sensors having to be provided.

The direct signal transmission from the first frequency converter to the second frequency converter is preferred within the scope of the present invention, because this leads to a particularly rapid reaction to an increase in the torque of the sawing tool drive; there are no delays due to signal processing in an electronic controller. However, it is also possible within the scope of the present invention to initiate the changeover from the idling feed rate to the working feed rate by a central controller of the sawing machine, in particular a stored-program controller (SPC). In this case, the first frequency converter may indicate the signal for changing of the feed rate to the central sawing machine controller, whereupon the latter reduces the working feed rate. If there is a second frequency converter for operating the feed motor, this second frequency converter may be addressed by the central controller. This "detour" via the central sawing machine controller may be provided in particular whenever this controller has high-speed electronics, and advantages can be obtained as a result because the controller allows a number of possibilities, including variable possibilities, of responding to a signal of the first frequency converter.

Due to the extremely fast reaction times between an increase in the torque of the sawing tool drive and a changeover of the feed rate, it is possible to choose a ratio of the working feed rate to the idling feed rate in the range from 1:2 to approximately 1:10, depending on the application up to 1:100 and above. As a result, the non-productive times of a sawing operation are reduced quite considerably without running the risk of the sawing tool being damaged or the lifetime thereof being reduced.

In order to shorten the non-productive times even more, and thereby keep the time expenditure for a sawing operation advantageously small, it is preferred to divide the idling feed rate into at least two rate stages, a first rate stage being designed as a rapid traversing mode and a second rate stage being designed as an approach rate. It is then possible here for a changeover, generally a slowing from the rapid traversing mode to the approach rate, to take place in the region of an approach distance between the sawing tool and the workpiece to be sawn that is preselected or pre-selectable, or possibly can also be determined by corresponding sensors, so that the rapid traversing mode can be even quicker than the actual idling feed rate.

An advantageous development of the present invention may also be that the value of the idling feed rate or the approach rate is made dependent on the dimensions and the form of the workpiece to be sawn and/or the material of the workpiece to be sawn. In the case of massive forms and/or particularly tough materials of the workpiece, a lower idling feed rate or approach rate is recommendable, in order to avoid damage to or excessive loading of the sawing tool, while in the case of soft materials and/or forms of the workpieces in which only a small engagement of the sawing tool in the material takes place in the case of an initial grazing, such as is the case for example with round materials, the idling feed rate or the approach rate may be chosen to be higher without having to fear damage to or excessively high loading of the sawing tool.

A further preferred development of the present invention is to increase the rate of the driven sawing tool in the region of an approach distance between the sawing tool and the workpiece in order to reduce the feeding distance per saw tooth when the sawing tool first engages in the workpiece, in the case of which according to the invention the changeover of the feed rate to the working feed rate takes place. This additionally helps to reduce the loading of the sawing tool when it engages in the workpiece, even if the changeover according to the invention from the idling feed rate to the working feed rate does not take place within the very shortest time, as is the case when the idling feed rate is chosen to be particularly high because of the masses of inertia.

For the same reason, preferred as an alternative or in addition to the aforementioned developments is a further refinement of the method according to the invention or of the sawing machine according to the invention in which the sawing tool is brought up to the workpiece in a damped and/or pre-stressed manner, the damping or pre-stressing taking place in relation to a cutting force acting in the direction of the feed rate. For this, the sawing machine comprises adjusting means for applying the cutting force that are provided with damping elements. In the case of band sawing machines, such adjusting means are generally guides for the saw band, in particular band back guides, while the adjusting means in the case of circular sawing machines are part of the sawing feed device. The damping elements mentioned may for example be spring assemblies, which damp a perhaps greatly increased cutting force or reaction thereto with respect to the cutting tool. Such a greatly increased cutting force may occur when the sawing tool hits the workpiece to be sawn, in particular whenever particularly high idling feed rates or approach rates are chosen.

In the case of a band sawing machine, the damping elements may also provide a pre-stressing of the saw band, in particular if they are designed as springs or spring assemblies. Due to such pre-stressing in the direction of the feed rate, the saw band may yield more overall when it hits the workpiece than would be the case with just damping.

As a particularly preferred development and second aspect of the present invention, finally, the value of the physical variable that is determined according to the invention in the first frequency converter and allows deductions to be made concerning the torque exerted by the sawing tool drive is used for controlling the actual cutting operation, in particular in that the torque transferred from the sawing tool drive to the sawing tool is kept essentially constant. In particular in the case of cylindrical workpieces and in the case of profiles, the loads on the sawing tool may vary greatly during the cutting operation, since sometimes more saw teeth and sometimes fewer saw teeth are in engagement with the material of the workpiece. The evaluation of the reactions of the sawing tool drive in the first frequency converter provides accurate deductions concerning the momentary loading on the sawing tool. If the feed rate of the sawing tool is controlled in dependence on the actual value of the physical variable determined in the first frequency converter for example in such a way that the torque transferred from the sawing tool drive to the sawing tool remains essentially constant, the loading of the sawing tool remains constant independently of the form of the workpiece. Narrower workpiece portions are then automatically sawn at a higher working feed rate than more massive workpiece portions, so that then, according to the invention, not only are the non-productive times of a sawing operation shortened, but also the actual cutting operation is optimized with regard to the working feed rate and a further shortening of the sawing operation can be achieved.

BRIEF DESCRIPTION OF THE DRAWINGS

An exemplary embodiment of a sawing machine according to the invention that is operated by an example of a method according to the invention is explained below on the basis of the accompanying drawings, in which:

FIG. 1 shows a schematic view of a band sawing machine that is designed according to the invention, FIG. 2 shows a schematic representation of the components of this band sawing machine that are essential to the invention;

FIG. 3 shows a diagram to illustrate the different movements and rates of this band sawing machine;

FIG. 5 shows a schematic basic circuit diagram of the control of the drives of a sawing machine designed according to the invention.

DETAILED DESCRIPTION OF THE PREFERRED EMBODIMENTS

Figure 4:
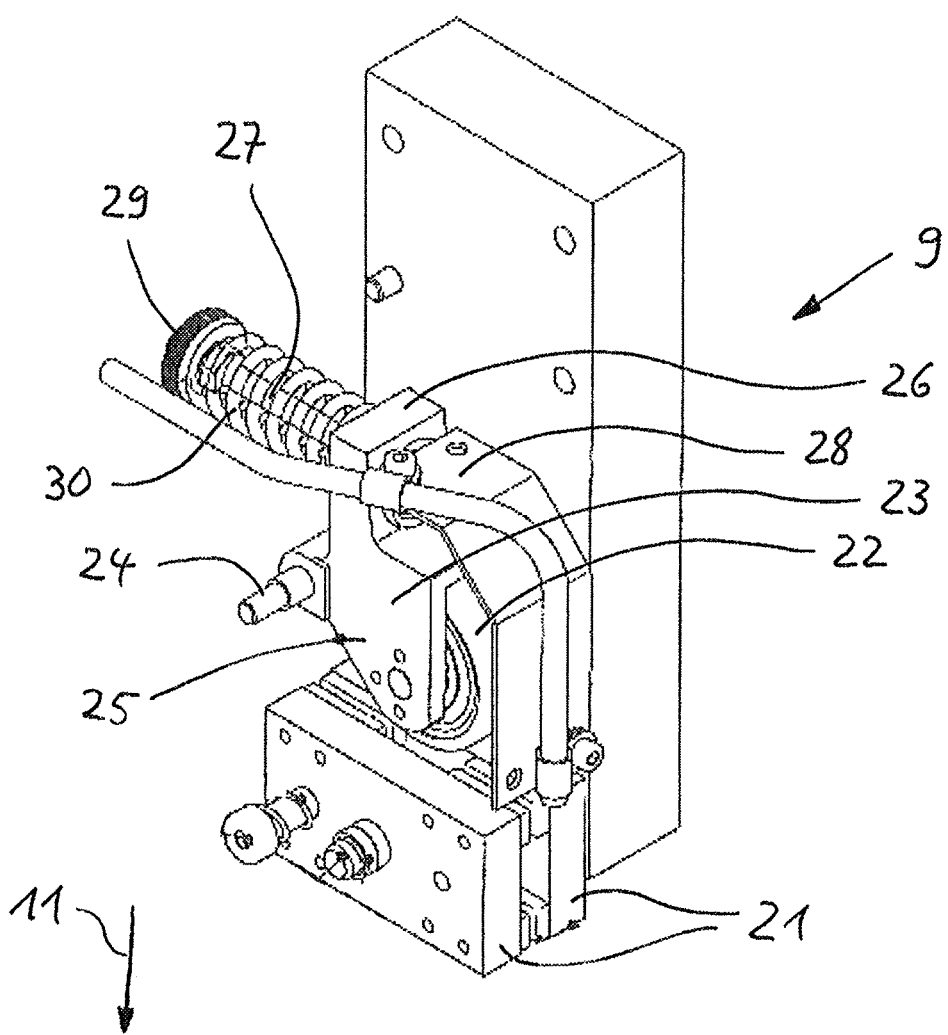
FIG. 4 shows a schematic view of a band guide of a band sawing machine with a spring-loaded band back guide.

In FIG. 1, a band sawing machine is schematically represented, with a base 1, a sawing table 2 attached thereupon for a workpiece 3 to be sawn and a sawing module 4, which is movable with respect to the base 1 and in which a saw band 5 runs endlessly around two running wheels 6. In a cutting region 7, the saw band 5 runs outside a sawing module housing 8, and is guided there by means of two band guides 9, which are arranged to the right and left of the cutting region 7. These band guides 9 include in each case of two lateral band guides and a band back guide, the band back guide being damped by means of spring assemblies, so that the saw band 5 can elastically yield upwardly against the force of the spring assembly.

The sawing module 4 rests on guides 10 and is movable up and down with respect to the base 1. The downward movement is the sawing feed movement 11.

As can be seen better from FIG. 2, a schematic representation of the parts of the band sawing machine represented in FIG. 1 that are essential to the invention, the movement of the sawing module 4 along the guides 10 takes place by means of a feed motor 12, which is operated by a second frequency converter 13. A first frequency converter 14 operates a motor 15, which is seated on an axle of one of the two running wheels 6 and drives it. The torque produced by the motor 15 consequently leads to the driving of the saw band 5, so that it runs around the two running wheels 6 at a sawing tool rate. The superposing of the circulating movement of the saw band 5 on the one hand, driven by the sawing tool drive 14, 15, with the sawing feed movement 11 on the other hand, driven by the sawing feed device 10, 12, 13, produces the sawing movement, which leads to the separating cut.

An example of a method according to the invention is illustrated in FIG. 3. The sawing module 4 is lowered onto the workpiece 3 due to the sawing feed movement 11. This involves covering an idling distance 16 until the saw band 5 makes contact with the workpiece 3 at level E of the idling distance 16. After that, the sawing feed movement 11 takes place along a working distance 17, until the workpiece 3 has been sawn through. The idling distance 16 is covered at an idling feed rate. When the level E is reached, the teeth of the saw band 5 make contact with the surface of the workpiece 3 and begin to penetrate it. As a result, the circulating movement of the saw band 5 is slowed, so that the motor 15 must deliver a higher torque to the running wheel 6 or the saw band 5 in order to maintain the circulating movement of the saw band 5. The increased torque requirement leads to a corresponding reaction with respect to the first frequency converter 14, in particular a higher active current flows. This is detected in the first frequency converter 14 and indicated by way of a digital data line 18, an analog data line or a bus line to the second frequency converter 13, which for its part immediately slows the feed motor 12 from the idling feed rate to a working feed rate. The actual cutting operation, that is to say the completion of the working distance 17, is then performed by the sawing module 4 or by the saw band 5 at the working feed rate.

A second exemplary embodiment of a procedure according to the invention can likewise be seen from FIG. 3. Here, the sawing module 4 initially moves along a rapid traversing distance 19 at a feed rate that is further increased with respect to the actual idling feed rate, as a rapid traversing mode. When a pre-settable level A is reached, the second frequency converter 13 slows down the feed motor 12 to the actual idling feed rate, at which an approach distance 20 is then completed, until in turn the engagement of the first teeth of the saw band 5 in the workpiece 3 takes place at level E and the feed rate is changed over from the idling feed rate to the working feed rate in order then, as in the first exemplary embodiment, to complete the working distance 17 up to the finished sawing cut.

In a third exemplary embodiment, the working feed rate is not constant over the working distance 17, but instead the torque delivered by the motor 15 to the running wheel 6, and consequently the saw band 5, is kept essentially constant by means of the reactions of the motor 15, which are detected and evaluated in the first frequency converter 14, in that the first frequency converter 14 emits a control signal by way of a bus line or a digital or analog data line to the second frequency converter 13. Since in the present case a round material or a cylindrical workpiece 3 is sawn, the working feed rate at the beginning of the actual cutting operation, at level E, may initially be chosen to be even higher, since only a few teeth of the saw band 5 are in engagement simultaneously with the material 3 there. This changes as the sawing progresses, since, on account of its profile, the workpiece becomes ever thicker for the saw band 5 and ever more sawing teeth come into engagement simultaneously with the material. Due to the constant maintenance of the torque delivered by the motor 15, the working feed rate is reduced correspondingly, so that the loading of the saw band 5 remains optimal. Toward the end of the actual sawing cut, the thickness of the workpiece 3 in turn decreases, so that the working feed rate can again be increased without loading the saw band 5 to an inadmissibly high degree.

Without such control, the working feed rate would have to be set to the minimum value over the entire working distance 17, in order to protect the saw band 5. The control therefore additionally reduces once again the time that is required for the actual cutting operation.

FIG. 4 shows in a schematic partial view a band guide 9 of a band sawing machine that is equipped with a spring-loaded band back guide in order to bring the sawing tool, in this case a saw band (not represented), up to the workpiece (in turn not represented) in both a pre-stressed and a damped manner. For this, the band guide 9 comprises two band guiding plates 21 for the lateral guidance of the saw band (not represented) sliding through between them, and also a band back guide, which is formed as a roller 22, rolls on the back of the saw band and pre-stresses it in the direction of the feeding movement 11. For this, the roller 22 is mounted in a rocker 23, which forms a two-armed lever around a rocking pin 24. A first arm 25 of the lever guides the roller 22, while a second arm 26 of the lever is seated on a connecting rod 27, which is anchored in a fixed counter bearing 28 and is variable in its length by means of a setting nut 29. Arranged between the setting nut 29 and the second arm 26 of the rocker 23 is a helical spring 30, which pre-stresses the second arm 26 toward the counter bearing 28 and, on account of the lever arm of the rocker 23, consequently also pre-stresses the roller 22 against the back of the saw band (not represented). A movement of the saw band counter to the sawing feed movement 11, which may occur when the saw band hits the workpiece to be sawn, is damped by the helical spring, since the roller 22 can to this extent yield in a spring-loaded manner.

FIG. 5 is a schematic circuit diagram of the control of the drives of a sawing machine designed according to the invention. A first frequency converter 14 for the sawing tool drive, a second frequency converter 13 for the sawing feed device and a third frequency converter 31 for a material feeding device for the positioning of the workpiece to be sawn are connected by way of a bus 32 to an I/O module of a stored-program controller 34.

In a preferred refinement according to the present invention, the first frequency converter 14 is connected by way of a first signal line 35, which extends from the digital output DO of the first frequency converter 14, to a digital input DI of the second frequency converter 13. In this way, the first frequency converter 14 can make the second frequency converter 13 change over to the working feed rate by means of a digital signal that is transmitted directly by way of the first signal line 35.

In a further alternative that is likewise comprised by the present invention, the first frequency converter 14 is connected by a second signal line 36 directly to the I/A module 33 of the stored-program controller 34 in order to emit a signal for the changing over of the feed rate directly to the stored-program controller 34, whereupon the latter can initiate the changeover to the working feed rate.

A third alternative, which is likewise comprised by the present invention, is that the first frequency converter 14 issues the signal for changing over the feed rate by way of the bus 32 to the stored-program controller 34, where the signal is further processed and used for changing over the feed rate.

The invention claimed is:

1. A method for controlling a sawing machine comprising a sawing tool (5), which is driven by an electrical sawing tool drive with a first frequency converter (14), and a sawing feed device for moving the driven sawing tool (5) at a feed rate toward and into a workpiece to be sawn (3), the method comprising:

changing the feed rate over from an idling feed rate to a working feed rate when the sawing tool (5) arrives at and begins cutting the workpiece (3), defined as a moment of first grazing by the sawing tool (5) of the workpiece (3), the idling feed rate being faster than the working feed rate, determining a current value of a physical variable which corresponds to a torque transferred from the sawing tool drive to the sawing tool (5) or from which a change in said torque can be calculated at the first frequency converter (14), wherein a first value of the physical variable is determined that corresponds to the working feed rate and a second value of the physical variable is determined that corresponds to the idling feed rate, and smoothing the current value of the physical variable determined at the first frequency converter (14) by a filtering process for smoothing a variation thereof over time, wherein changing the feed rate from the idling feed rate to the working feed rate is dependent on the current value of said physical variable that has been smoothed creating a smoothed current value of said physical variable, and wherein the change from the idling feed rate to the working feed rate is initiated when a threshold value for a difference between the smoothed current value of said physical variable and the second value of said physical variable is exceeded.

2. The method according to claim 1, wherein an active current emitted by the first frequency converter (14) to a motor (15) of the electrical sawing tool drive is used as the physical variable.

3. The method according to claim 1, wherein the difference is determined continuously or at intervals at the first frequency converter (14).

4. The method according to claim 1, wherein the sawing feed device comprises a second frequency converter (13) and a feed motor (12) operated by the second frequency converter, and the method further comprises the changeover from the idling feed rate to the working feed rate taking place in dependence on a signal emitted by the first frequency converter (14) to the second frequency converter (13).

5. The method according to claim 1, wherein the working feed rate is controlled in dependence on the current physical variable, such that the torque transferred from the sawing tool drive to the sawing tool (5) is kept essentially constant.

6. The method according to claim 1, further comprising bringing the sawing tool (5) up to the workpiece (3) in at least one of a damped or pre-stressed manner, the at least one of the damping or the pre-stressing taking place in relation to a cutting force acting in a direction of the feed rate.

7. The method according to claim 1, wherein at least one of the idling feed rate or the working feed rate or a ratio of the idling feed rate to the working feed rate is selectable in dependence on at least one of a geometry or a material of the workpiece (3) to be sawn.

8. A sawing machine, comprising a sawing tool (5), which is driven by an electrical sawing tool drive with a first frequency converter (14), a sawing feed device for moving the driven sawing tool (5) at a feed rate in relation to a workpiece (3) to be sawn, the sawing feed device being configured so that the feed rate is changeable from an idling feed rate to a working feed rate when the sawing tool (5) arrives at and begins cutting the workpiece (3), defined as a moment of first grazing by the sawing tool (5) of the workpiece (3), the idling speed rate being faster than the working feed rate, wherein the sawing feed device is configured such that a current value of a physical variable which corresponds to a torque transferred from the sawing tool drive to the sawing tool (5) or from which a change in said torque can be calculated is determined at the first frequency converter (14), wherein a first value of the physical variable is determined that corresponds to the working feed rate and a second value of the physical variable is determined that corresponds to the idling feed rate, and the changeover from the idling feed rate to the working feed rate takes place in dependence on the current value of said physical variable, wherein the sawing feed device is configured to smooth the current value of the physical variable determined at the first frequency converter (14) by a filtering process for smoothing a variation thereof over time to create a smoothed current variable, and wherein the sawing feed device is configured such that the changeover from the idling feed rate to the working feed rate takes place when a threshold value for a difference between the smoothed current value of said physical variable and the second value of said physical variable is exceeded.

9. The sawing machine according to claim 8, further comprising an adjusting assembly that applies to the sawing tool (5) at least one of a cutting force acting in a direction of a feed rate or a guiding force that guides the sawing tool (5) in the direction of the feed rate, the adjusting assembly being provided with at least one of damping elements or pre-stressing elements for bringing the sawing tool (5) up to the workpiece (3) in at least one of a damped or pre-stressed manner.

10. The sawing machine according to claim 8, wherein the sawing feed device comprises a second frequency converter (13) and a feed motor (12) operated thereby, and the changeover from the idling feed rate to the working feed rate takes place in dependence on a signal emitted by the first frequency converter (14) to the second frequency converter (13).

11. The sawing machine according to claim 8, wherein the second value corresponds to an average idling value of the physical variable that is determined at the first frequency converter (14).

12. The sawing machine according to claim 8, wherein the first frequency converter (14) controls the working feed rate in dependence on the physical variable, such that the torque transferred from the sawing tool drive to the sawing tool (5) is essentially constant.

13. The sawing machine according to claim 8, wherein at least one of the idling feed rate or the working feed rate or a ratio of the idling feed rate to the working feed rate is selectable in dependence on at least one of a geometry or material of the workpiece (3) to be sawn.

* * * * *